United States Patent [19]

Pitner

[11] 3,976,340
[45] Aug. 24, 1976

[54] DEVICE FOR MOUNTING A RADIAL ROLLING BEARING

[75] Inventor: Alfred Pitner, Paris, France

[73] Assignee: Nadella, France; a part interest

[22] Filed: Jan. 20, 1975

[21] Appl. No.: 542,680

[30] Foreign Application Priority Data
Jan. 23, 1974   France .............................. 74.02271

[52] U.S. Cl. .............................. 308/184 R; 308/216
[51] Int. Cl.² ............................................ F16C 33/58
[58] Field of Search ............ 308/184 R, 202, 207 R, 308/216, 217, 184 R, 216, 47 R

[56] References Cited
UNITED STATES PATENTS
3,630,586   12/1971   Pitner .............................. 308/184 R
FOREIGN PATENTS OR APPLICATIONS
1,029,525   3/1953   France ................................. 308/184
174,257   3/1953   Germany ........................... 308/184
1,204,156   9/1970   United Kingdom ................. 308/184

Primary Examiner—M. H. Wood, Jr.
Assistant Examiner—Richard A. Bertsch
Attorney, Agent, or Firm—Robert E. Burns; Emmanuel J. Lobato; Bruce L. Adams

[57] ABSTRACT

The device comprises an elastically yieldable collar in the form of a thin-walled ring and there is engaged in this ring a thin sleeve which serves as a raceway for the rolling elements of the radial rolling bearing to be mounted by the device. The sleeve has an elasticity enabling it to deform radially under the action of forces transmitted thereto by the rolling elements and is preformed in accordance with an irregular profile which defines circumferentially of the sleeve alternately cylindrical segments defining a usual radial clearance of the rolling elements and inwardly offset cylindrical segments which define a passage for the rolling elements of reduced radial width.

16 Claims, 5 Drawing Figures

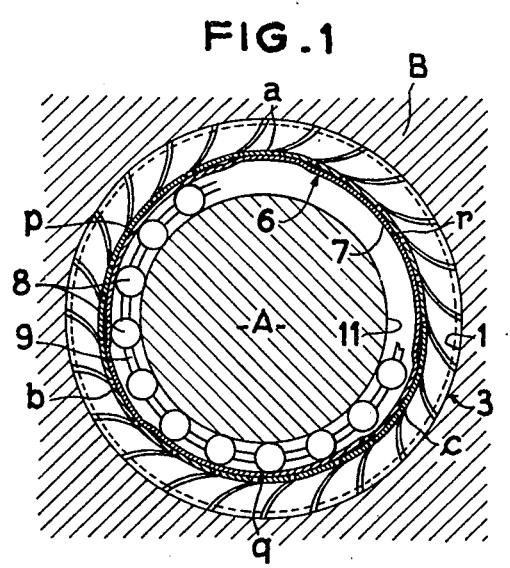
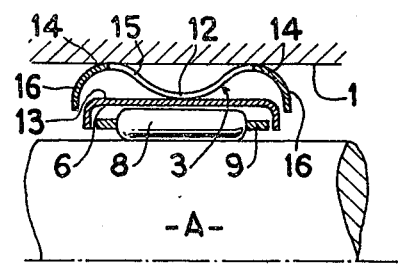
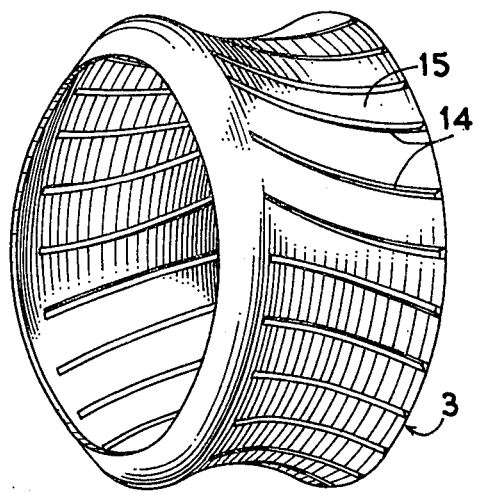
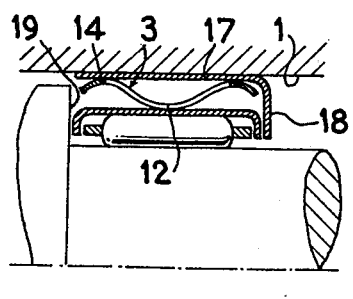
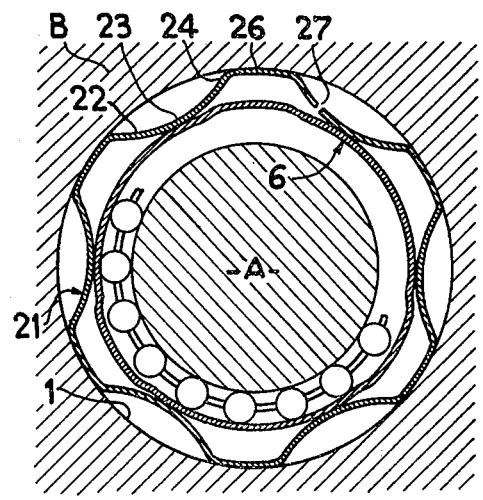

DEVICE FOR MOUNTING A RADIAL ROLLING BEARING

An object of the present application is to provide a device for mounting a radial rolling bearing comprising an elastically yieldable collar in which is engaged a thin sleeve which is preformed in accordance with an irregular profile and defines regions in which the radial clearance for the circulation of the rolling elements is reduced or nil.

There was described in the U.S. Pat. No. 3,883,194 such a device in which the sleeve bears against a rigid support with interposition of an elastically yieldable collar of elastomer against which at least the segments having a reduced diameter bear so as to be supported in the course of the absorption of radial loads transmitted thereto by the rolling elements.

The object of the present application is to propose a new and useful embodiment of such a radial rolling bearing mounting device which is of small overall size and/or is capable of operating in a satisfactory manner under high loads exceeding the supporting capacity of the collar. Indeed, in some applications, for example in vehicle suspension articulations, the loads to be transmitted may be considerable and correct operation cannot be ensured by the utilization of an elastomer collar alone since, although the latter permits a displacement of small extent for the usual loads, it is incapable, owing to the mechanical properties of the elastomer, of imposing a limit to the displacement of the shaft in the presence of high loads. Now, it is essential to provide such a limit which, when reached, must of necessity be converted into a rigid support for the sleeve in the bore for maximum deformation of the collar. In order to overcome the aforementioned drawbacks, the present invention provides a device of small radial overall size which affords the desired limitation to the radial movement of the shaft in applications in which considerable radial forces arise, wherein the elastically yieldable collar is constituted by a thin ring. Under the effect of the loads, the ring is capable of undergoing an essentially radial elastic deformation, the maximum extent of said deformation defining for the sleeve and the shaft normally disposed in the sleeve an extreme radial position.

The ring is rendered elastically yieldable by giving to the peripheral wall of the ring in a radial or axial plane a curved profile which defines at least one convex surface bearing on the outer surface of the sleeve and at least one convex surface adapted to bear against the inner surface of the bore of a support. The curved part is then capable of being crushed under load and, in the extreme position, capable of achieving a cylindrical shape in which position there is a radial abutment of the sleeve against the ring, the latter being applied cylindrically, in the considered region, against the bore.

In order to impart an improved elasticity to the ring, there are provided slots or cut-away portions in at least the curved part of the wall of the ring and preferably throughout its circumferential extent. In a preferred embodiment, said slots have a generally oblique direction with respect to the axis of the ring so as to ensure that, under load, there is no risk that the deformations of the ring produce deformation in the sleeve.

The invention will be understood more clearly from the ensuing description of two embodiments which are given solely by way of example with reference to the accompanying drawings, in which:

FIG. 1 is a radial sectional view of a rolling bearing mounted in its housing or support;

FIG. 2 is an axial sectional view of the bearing shown in FIG. 1 showing the generally toric shape of the wall of the ring;

FIG. 3 is a perspective view of the metal ring in which the sleeve is engaged;

FIG. 4 is an axial sectional view, similar to FIG. 2, of a modification, and

FIG. 5 is a radial sectional view of another embodiment of the rolling bearing according to the invention.

FIG. 1 shows a support B having a bore 1 in which is fitted a collar 3 constituted by a thin steel ring in which is engaged a sleeve 6 also of steel whose inner surface 7 constitutes the outer raceway of a ring arrangement of rolling elements 8 in the form of needles which are preferably guided in a cage 9 and are in rolling contact with the outer surface 7 of a shaft A. It must be understood that the thin ring may be constructed from any other material, for example a synthetic material such as Nylon or a nonsynthetic material provided that it is capable of being deformed elastically.

As described in the aforementioned U.S. Pat. No. 3,883,194, the sleeve 6 is preformed in accordance with an irregular profile which defines three cylindrical segments $a$, $b$, $c$ which alternate with cylindrical segments $p$, $q$, $r$ which are inwardly offset and preferably subtend at the centre angles of more than 60°. Further, the ring has, after it is mounted in the bore 1, a variable radial dimension so as to compensate for the irregular profile of the sleeve.

FIG. 2 shows in axial section the general toric shape 15 of the ring 3 defined by a centre continuous curved portion 12 which has a convex surface bearing against the outer surface 13 of the sleeve and is connected to two lateral portions 14 which are curved in the opposite direction and have a convex surface in contact with the wall of the bore 1. The centre curved portion 12 which is in contact with the sleeve 6 in the region of the centre part of the rolling elements or needles, imparts to the ring 3 a radial elasticity and, when the rolling bearing is placed in position in the bore 1, this ring is subjected to a slight radial prestressing.

Under the effect of the loads, the sleeve exerts locally a pressure on the convex portion 12 of the ring 3 which is crushed in the annular space defined by the surface 13 and the wall of the bore. The application of a load in one of the segments $p$, $q$, $r$ of the sleeve, for example in the segment $q$, results in a deformation of this segment and, correspondingly, in a compensating deformation of the complementary segments $q$, $r$ under the effect of the ring 3. This spring function enables the ring 3 to suitably support the sleeve upon radial displacement of the shaft and, in the extreme case, provide the shaft a positive or rigid abutment in the bore. Thus, in accordance with the present invention, this elastically yieldable ring, in bearing against the sleeve and in particular against the regions ensuring a reduced or zero clearance for the rolling elements, can, under high radial loads transmitted by the rolling elements to said regions, deform to the extent of ensuring in the housing a support throughout, or in the major part of, its width, so that, at this moment, the whole of the sleeve surrounded by the ring 3 ensures a rigid support and a distinct limit to the elastic deformations while presenting a support surface which is as large as possible for the rolling elements and the desired conditions of absorption of the radial loads are obtained.

It will be understood that the elasticity of the ring 3 may be predetermined in such manner as to enable it to perform its function irrespective of the stress it is capable of undergoing in a given application.

As shown in FIG. 3, the elasticity of the ring 3 is improved by providing on its toric wall 15 slots 14 or like cut-away portions provided on the whole of its circumferential extent between the edge or rim portions of the collar. According to a preferred embodiment, said slots, which extend throughout the thickness of the ring, have an oblique direction with respect to the direction in which the axis of the ring extends.

It is of course possible to obtain the desired result by providing slots having, for example, a T, H or other shape of different directions or arrangements without departing from the scope of the present invention.

For the purpose of maintaining the sleeve inside the ring, there may be provided (FIG. 2) on at least one edge portion of the toric wall 15 a radial flange 16 which may be continuous or discontinuous against which the sleeve can bear axially. In order to facilitate, after the forming of the ring on a mandrel, the withdrawal of the ring from the mandrel or to fit the collar-sleeve assembly, it is sometimes desirable to provide a single radial flange 16 or, possibly, flanges of unequal radial widths on the respective edge portions.

In the modification shown in FIG. 4, the ring 3 is engaged in a cylindrical sheath 17 of plastics material or, preferably, steel, itself fitted in the bore 1. The ring 3 has no radial flange such as the flanges 16 shown in FIG. 2. The axial retaining function of these flanges is performed, in one direction, by a radial flange 18 on the sheath 17 and, in the other direction, by a shoulder 19 on the shaft A.

FIG. 5 shows in radial section another embodiment in which the radially elastically yieldable collar is constituted by a ring 21 of corrugated circumferential profile having alternately inwardly curved portions 22 whose convex surface 23 bears against the segments of the sleeve where the clearance for the rolling elements must be reduced, and outwardly curved portions 24 whose convex surface 26 bears against the bore 1. This ring 21, which is radially prestressed, has an axial slot 27 which opens onto the peripheral edge portions of the ring.

Such a slot may be also provided in the ring 3 shown in FIGS. 1 and 4.

The elastically yieldable ring 21 shown in FIG. 5 could have a very large number of corrugations so that the curved parts 22 bear against both the cylindrical segments of the sleeve defining reduced clearance and the segments defining normal clearance for the rolling elements.

Having now described my invention what I claim as new and desired to secure by Letters Patent is:

1. A device for mounting in a bore of a support a radial rolling bearing having rolling elements, comprising an elastically yieldable collar in which is engaged a thin sleeve which serves as a raceway for the rolling elements and has an elasticity enabling it to deform radially under the action of forces transmitted by the rolling elements, said sleeve being performed in accordance with an irregular profile which defines circumferentially of the sleeve alternately cylindrical segments having an inside radius for defining a passage with an inner raceway for the rolling elements affording a usual radial clearance for the rolling elements and inwardly offset cylindrical segments for defining a passage with said inner raceway of reduced radial width for the rolling elements, said elastically yieldable collar comprising a thin-walled ring.

2. A device for mounting in a bore of a support a radial rolling bearing having rolling elements, comprising an elastically yieldable collar in which is engaged a thin sleeve which serves as a raceway for the rolling elements and has an elasticity enabling it to deform radially under the action of forces transmitted by the rolling elements, said sleeve being preformed in accordance with an irregular profile which defines circumferentially of the sleeve alternately cylindrical segments having an inside radius for defining a passage with an inner raceway for the rolling elements affording a usual radial clearance for the rolling elements and inwardly offset cylindrical segments for defining a passage with said inner raceway of reduced radial width for the rolling elements, said elastically yieldable collar comprising an elastically yieldable thin-walled ring, the elasticity of the thin-walled ring being due to the presence in the ring wall of at least one curved portion which defines at least one inwardly convex surface bearing on the outer surface of the sleeve and at least one outwardly convex surface bearing against the inner surface of the bore of the support.

3. A device for mounting in a bore of a support a radial rolling bearing having rolling elements, comprising an elastically yieldable collar in which is engaged a thin sleeve which serves as a raceway for the rolling elements and has an elasticity enabling it to deform radially under the action of forces transmitted by the rolling elements, said sleeve being preformed in accordance with an irregular profile which defines circumferentially of the sleeve alternately cylindrical segments having an inside radius for defining a passage with an inner raceway for the rolling elements affording a usual radial clearance for the rolling elements and inwardly offset cylindrical segments for defining a passage with said inner raceway of reduced radial width for the rolling elements, said elastically yieldable collar comprising a thin-walled ring, the elasticity of the ring being due to the provision in the ring wall of a substantially centre toric portion which is curved radially in a direction to define an inner convex surface which bears against the outer surface of the sleeve and two lateral portions which are connected to the centre toric portion and curved radially in an opposite direction and define two outer convex surfaces bearing against the bore of the support.

4. A device as claimed in claim 3, wherein the contact of the centre toric portion is located in a plane through the median region of the rolling elements.

5. A device for mounting in a bore of a support a radial rolling bearing having rolling elements, comprising an elastically yieldable collar in which is engaged a thin sleeve which serves as a raceway for the rolling elements and has an elasticity enabling it to deform radially under the action of forces transmitted by the rolling elements, said sleeve being performed in accordance with an irregular profile which defines circumferentially of the sleeve alternately cylindrical segments having an inside radius for defining a passage with an inner raceway for the rolling elements affording a usual radial clearance for the rolling elements and inwardly offset cylindrical segments for defining a passage with said inner raceway of reduced radial width for the rolling elements, said elastically yieldable collar comprising a thin-walled ring, the elasticity of the ring being due to the provision in the ring wall of a circumferentially corrugated profile defined by inwardly curved portions each defining an inner convex surface bearing against the sleeve and outwardly curved portions which alternate with the inwardly curved portions and each define a convex surface bearing against the bore of the support.

6. A device for mounting in a bore of a support a radial rolling bearing having rolling elements, comprising an elastically yieldable collar in which is engaged a thin sleeve which serves as a raceway for the rolling elements and has an elasticity enabling it to deform radially under the action of forces transmitted by the rolling elements, said sleeve being performed in accordance with an irregular profile which defines circumferentially of the sleeve alternately cylindrical segments having an inside radius for defining a passage with an inner raceway for the rolling elements affording a usual radial clearance for the rolling elements and inwardly offset cylindrical segments for defining a passage with said inner raceway of reduced radial width for the rolling elements, said elastically yieldable collar comprising a thin-walled ring, the ring having in at least a circumferentially extending portion of the ring wall apertures which extend between edge portions of the ring.

7. A device as claimed in claim 6, wherein the ring has a series of slots which are arranged on the whole of the circumferential extent of its wall and have a generally oblique direction with respect to the axis of the ring.

8. A device as claimed in claim 3, wherein the wall of the ring has on an edge portion a radial flange against which flange the sleeve is capable of bearing.

9. A device as claimed in claim 3, comprising a cylindrical sheath for fitting in the bore of the support, the sleeve and ring forming an assembly contained in the sheath.

10. A device as claimed in claim 9, wherein the sheath has a radial flange against which the ring-sleeve assembly is capable of bearing.

11. A device as claimed in claim 1, wherein the ring is continuous.

12. A device as claimed in claim 1, wherein the ring defines an axially extending throughway slot.

13. A device as claimed in claim 1, wherein the ring is of metal.

14. A device as claimed in claim 1, wherein the ring is of synthetic material.

15. A device as claimed in claim 9, wherein the sheath is of plastics material.

16. A device as claimed in claim 9, wherein the sheath is of steel.

* * * * *